(12) United States Patent
Bracha (10) Patent No.: US 7,810,077 B2
(45) Date of Patent: Oct. 5, 2010

(54) REIFYING GENERIC TYPES WHILE MAINTAINING MIGRATION COMPATIBILITY

(75) Inventor: Gilad Bracha, Los Altos, CA (US)

(73) Assignee: Oracle America Inc., Redwood City, CA (US)

( * ) Notice: Subject to any disclaimer, the term of this patent is extended or adjusted under 35 U.S.C. 154(b) by 1570 days.

(21) Appl. No.: 11/109,540

(22) Filed: Apr. 18, 2005

(65) Prior Publication Data

US 2006/0236315 A1    Oct. 19, 2006

(51) Int. Cl.
*G06F 9/44* (2006.01)
*G06F 9/45* (2006.01)

(52) U.S. Cl. .................. 717/131; 717/118; 717/148

(58) Field of Classification Search .............. None
See application file for complete search history.

(56) References Cited

U.S. PATENT DOCUMENTS

| | | | | |
|---|---|---|---|---|
| 5,737,607 | A * | 4/1998 | Hamilton et al. | 719/316 |
| 6,018,628 | A | 1/2000 | Stoutamire et al. | |
| 7,316,010 | B1 * | 1/2008 | Daynes et al. | 717/140 |
| 2003/0131347 | A1 * | 7/2003 | Allison | 717/165 |
| 2004/0216094 | A1 * | 10/2004 | Bosworth et al. | 717/141 |
| 2006/0048095 | A1 * | 3/2006 | Meijer et al. | 717/114 |

OTHER PUBLICATIONS

Bracha, Gilad, "Generics in the Java Programming Language," [online], Jul. 5, 2004, [retrieved on Jun. 14, 2005]. Retrieved from the Internet: <http://java.sun.com/j2se/1.5/pdf/generics-tutorial.pdf>, pp. 1-23.
Wikström, Ake, "Functional Programming Using Standard ML," 1987, Prentice Hall International Series in Computer Science, XP002400699, pp. 56-57, pp. 97-98 (Section 8.1.4), p. 103 (Summary), p. 143 (Patterns with Type Constraint, p. 142.
European Patent Office, "European Search Report," App. No. 06252016.8, dated Oct. 16, 2006, 6 pages.
Claims, App. No. 06252016.8, 7 pages. [attached].
European Patent Office, "European Search Report", Foreign Application No. EP 06 25 3209, Received Jan. 16, 2008, 5 pages.
Claims, Foreign Application No. EP 06 25 3209, 7 pages.
Gosling et al., "The Java Language Specification—Third Edition (Chapter 8)", XP-002461538, ISBN: 0-321-24678-0, Addison-Wesley, May 2005, 120 pages.

* cited by examiner

*Primary Examiner*—Michael J Yigdall
*Assistant Examiner*—Evral Bodden
(74) *Attorney, Agent, or Firm*—Osha • Liang LLP (57) ABSTRACT

In accordance with one embodiment of the present invention, there is provided a technique for reifying generic types while maintaining migration compatibility. According to this technique, the actual type parameters that should be associated with a raw type, but which are not expressed in a binary file, are dynamically inferred at run time. The actual type parameters are inferred based on the run time usage of an object that is an instance of the raw type.

16 Claims, 4 Drawing Sheets

REIFYING GENERIC TYPES WHILE MAINTAINING MIGRATION COMPATIBILITY

BACKGROUND

Java Development Kit (JDK) is a software development kit for producing Java programs. JDK version 1.5 introduced several extensions to the Java programming language. One of these extensions is the introduction of "generic types."

Generic types in Java are similar to, but not exactly the same as, templates in the C++ programming language. Generic types may be most easily understood through a discussion of the scenarios that make the use of generic types beneficial.

According to the syntactical rules of strongly typed programming languages such as Java, the data type of a variable is supposed to be expressed in the declaration of that variable. The following declaration is illustrative:

Integer x=new Integer(0);

In the above declaration, the variable "x" is declared to be of type "Integer." Thus, any attempt to assign, to "x," an object that not an instance of the "Integer" class or a subtype thereof, should be forbidden and should cause the compiler to alert the programmer that something is amiss in the assignment.

The following declaration is somewhat more sophisticated and informative:

List myIntList=new LinkedList( );

In the above declaration, the variable "myIntList" is declared to be of type "List." When the above expression is evaluated, a new instance of the "LinkedList" class (i.e., a "LinkedList" object) is created ("instantiated") via the invocation of the "LinkedList( )" constructor method and assigned to "myIntList." The "List" and "LinkedList" classes are used as examples in the discussion below, but it should be understood that the behaviors of the classes discussed below are not limited only to these classes.

Like other variables of type "List," the variable "myIntList" can be assigned "LinkedList" objects. The "LinkedList" object is a linked list of other objects. Prior to the introduction of generic types in Java, the compiler could not determine what the specific types of these other objects were. The type system was a conservative approximation of run-time behavior. For example, without generic types, if only "Foo"-type objects were "inserted" into a LinkedList, then the compiler could not determine, upon "extraction" of these objects from the LinkedList, that the objects were of type "Foo." Without generic types, the compiler merely could determine that these objects were instances of some indeterminable subtype of the "Object" class; in Java, all classes are subtypes of the "Object" class. Because this was as specific as the compiler could get, the "extracted" objects could only have the methods of the "Object" class (as opposed to the "Foo" class) invoked relative to them.

Because of this shortcoming, it often became necessary for a programmer to "cast" such a returned object into a particular data type prior to assigning that object to a variable that was declared to be of the particular data type. The following code is demonstrative:

Integer x=(Integer) myIntList.iterator( ).next( );

In the above code, the "Object" type object returned by the method is expressly cast into an variable of type "Integer." If this cast were not performed, then the compiler might complain that a non-"Integer" type object was being assigned to a variable of type "Integer." Indeed, such a complaint would be beneficial, because if the compiler did not complain about such an assignment, then the compiled program might exhibit unexpected and unwanted behavior if and when the method returned an object that actually was not an Integer.

Having to cast objects in this manner usually irritates programmers and makes source code undesirably verbose and less readable. Some might even consider casting to be a "dirty" programming practice. Fortunately, the advent of generic types in Java made casting unnecessary, at least for the purposes discussed above. A sample declaration that incorporates generic types follows:

List<Integer>myIntList=new LinkedList<Integer>( );

This is similar to the non-generically typed declaration above, except that the declaration expressly indicates that the objects within the linked list assigned to "myIntList" are going to be instances of class "Integer." In light of the declaration, the compiler knows that every object returned by the "myIntList.iterator( ).next( )" method is an "Integer" object. The compiler will not complain about the expression Integer x=myIntList.iterator( ).next( );

because the compiler can determine that the object returned by the method must be an "Integer" object, and that variable "x" can reference objects of type "Integer." A single declaration makes potentially many casts unnecessary.

It is also should be noted that generic types allow for specificity in this manner without requiring multiple separate implementations of the class. Although "myIntList" is a "List" object that references "Integer" objects, it was not necessary for the programmer to specifically code an implementation of the "List" class to reference only "Integer" objects. Generic types allow a class to be defined once in a generic manner, and then invoked multiple times in different specific declarations.

Due to the more precise approximation of run-time behavior that generic types provide, generic types also help to avoid runtime failures.

An actual example of generic type declarations is shown below:

```
public interface List<E> {
    void add(E x);
    Iterator<E> iterator( );
}
public interface Iterator<E> {
    E next( );
    boolean hasNext( );
}
```

In the above generic type declarations, the angle bracket-enclosed parameters (e.g., "<E>") are called the "formal type parameters" of the generic types. The specific invocation of such a generic type is called a "parameterized type." For example, the following type expression is a parameterized type:

List<Integer>

In the foregoing parameterized type, "<Integer>" is an example of an "actual type argument." Parameterized types specify actual type arguments that are to be put in the place of formal type parameters when the generic type declaration is invoked.

Although Java generic types and C++ templates are somewhat similar syntactically and functionally, there are some significant differences between the two. The declaration of a Java generic type is not expanded, either within source code or within binary code, into multiple different specific declarations for different actual type arguments. Instead, much like with non-generic type declarations in Java, a Java generic type declaration is compiled into a single class file.

Because generic types are so useful, many of the non-generic type declarations that used to exist in the Java libraries have been replaced with generic type declarations. Non-generic method declarations also have been replaced in these libraries with generic method declarations. In other words, the former non-generic type and method declarations have been "generified." Programmers who are writing new Java programs can make use of the generic types and methods by putting parameterized types in their programs.

However, because the Java language has already been in existence for a significant period of time, many Java programs already have been written. As can be imagined, many of these programs do not contain parameterized types. Instead, many of these programs contain invocations that do not specify an actual type argument. If the compiler required every invocation of a generic type declaration to be a parameterized type (as opposed to an invocation that did not specify an actual type argument), then many of the existing Java programs would be incompatible with the new Java libraries.

One attempt to solve the above problem would be to require existing Java programs to be modified so that every invocation of a generic type declaration specified an actual type argument for each formal type parameter in the generic type declaration. Modifying very large programs in this manner would be an onerous task—so onerous, in fact, that programmers might prefer instead to forego entirely the use of the new Java libraries and generic type mechanisms.

Another approach to solving the above problem involves implementing the compiler in such a way that the compiler permits programs to contain invocations of generic type declarations even if those invocations do not specify actual type arguments for the formal type parameters in the generic type declarations. A generic type invocation that does not specify actual type arguments for the formal type parameters in the generic type declaration is called a "raw type" (in contrast to a "parameterized type," which does specify such actual type arguments). When a compiler encounters an expression that refers to a raw type, the compiler warns that the correctness of the expression cannot be guaranteed; the compiler cannot perform type checking with respect to the raw type. Nevertheless, the compiler allows compilation to proceed. The burden is placed on the programmer to ensure that the expression does not cause undesirable effects at run time.

The Java runtime environment traditionally has provided run time data structures and mechanisms that a program could use to determine, at run time, class information about objects that have been instantiated. For example, using the "instanceof" operator, a Java program could determine whether a specified object was an instance of a specified class.

However, when a Java program is compiled, the actual type arguments that are specified in parameterized types are not preserved in the resulting binary file; such arguments are lost in a process called "erasure." Although not necessarily its sole purpose, erasure allows programs that contain raw types to interoperate with libraries that contain generic type declarations, as described above. Through erasure, the binary representation of an instance of a parameterized type becomes identical to the binary representation of an instance of the corresponding raw type. Because these binary representations are identical, old binary files, which were compiled from programs that contained raw types, can be linked with new binary files, which were compiled from libraries that contained generic type declarations.

Unfortunately, as a consequence of erasure, the Java runtime environment currently does not have any way of allowing a program to determine some specific information about objects that are instances of parameterized types.

For example, the Java runtime environment currently does not allow a program to determine whether a specified object is an instance of a parameterized type that has specified actual type arguments. Although the Java runtime environment can accurately evaluate an expression whose result depends upon whether a variable "x" is a variable of type "Collection" generally, for example, the Java runtime environment currently cannot accurately evaluate an expression whose result depends upon whether variable "x" is a variable of type "Collection<String>" specifically. Even if the source code originally expressed a parameterized type with actual type argument "<String>," the actual type argument "<String>" would have been erased when the program was compiled into a binary file.

Nevertheless, programmers, having worked for so long with a Java runtime environment that could accurately evaluate expressions of the former kind, naturally expect that the Java runtime environment should be able to evaluate, accurately, expressions of the latter kind.

SUMMARY

In accordance with one embodiment of the present invention, there is provided a technique for reifying generic types while maintaining migration compatibility. According to this technique, the actual type parameters that should be associated with a raw type, but which are not expressed in a binary file, are dynamically inferred at run time. The actual type parameters are inferred based on the run time usage of an object that is an instance of the raw type.

In one embodiment, an actual type argument of a generic type, of which a particular object is an instance, is determined dynamically based on the usage of the object at run time. This occurs under circumstances in which the invocation of the object does not specify any actual type argument; for example, the invocation might be "List myIntList," which lacks an actual type argument such as "<Integer>." Data that indicates the actual type argument is generated. An association between the particular object and the data is established. As a result, a run time environment can read the actual type argument of the particular object's type from the data whenever the actual type argument of the particular object's type is tested or otherwise needed in a program.

The actual type argument of the particular object's type may be determined using various means. For example, the actual type argument may be determined based on the types of other objects that are inserted into the particular object. For another example, the actual type argument may be determined based on another actual type argument that is associated with a parameter of a method to which the particular object is passed as input. For another example, the actual type argument may be determined based on another actual type argument that is associated with another object to which the particular object is assigned.

The techniques described herein may be used to dynamically determine actual type arguments even under circumstances when all actual type arguments specified in generified libraries were erased at compile time to maintain compatibility between the libraries and legacy code that contains only raw types—code that has not yet been "migrated" to incorporate parameterized types. Thus, the techniques described herein can be used to reify generic types while also maintaining migration compatibility.

DETAILED DESCRIPTION OF EMBODIMENT(S)

Overview

In accordance with one embodiment of the present invention, techniques are provided for reifying generic types. An operational flow diagram, which illustrates a high level overview of the operation of one embodiment of the present invention, is shown in FIG. 1.

Figure 1:
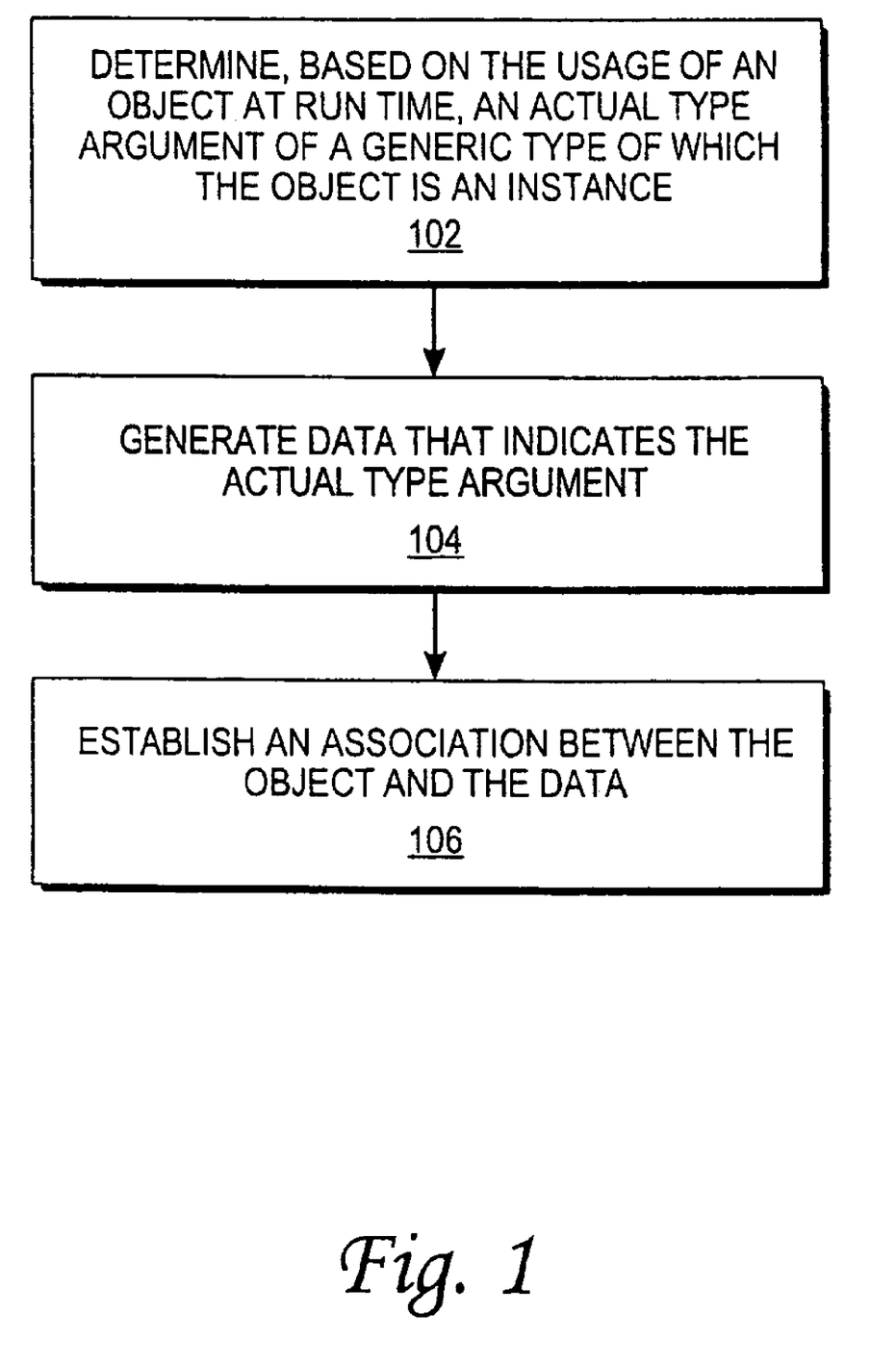
FIG. 1 is a flow diagram that illustrates an overview of the operation of an embodiment of the present invention.

Referring to FIG. 1, in block 102, an actual type argument of a generic type of which an object is an instance is determined. The actual type argument is determined based on the usage of the object at run time.

For example, a Java Virtual Machine (JVM) may be running a Java program that contains a raw type. The raw type is an invocation of a generic type that does not specify any actual type arguments (e.g., "List myIntList"). Based on how the object, which is an instance of the raw type, is passed, assigned, and/or has its methods invoked, the JVM may at least partially determine an actual type argument of the object's type.

For example, if object "myintList" is passed as a parameter to a method "count(Collection<Number>c)," then the JVM may determine from this that the actual type parameter of the object's "List" type is "Number" or a subtype thereof, in other words, the JVM may determine that "myIntList" is an instance of generic type "List<Number>."

In block 104, data that indicates the actual type argument is generated. For example, the JVM may generate data that indicates an actual type argument of "<Number>."

In block 106, an association is established between the object and the data. For example, the JVM may store, in a run time data structure, an association between object "myIntList" and actual type parameter "<Number>." Thereafter, the JVM may refer to the association whenever the generic type of object "myIntList" is tested, such as in an expression that includes the "instanceof" operator or a cast. The JVM may refer to the association to determine whether other expressions that involve the object, such as assignments, are legal.

In other aspects, the invention encompasses, in certain embodiments, computer apparatuses, computing systems, and computer-readable media configured to carry out one or more of the foregoing techniques.

Dynamically Inferring Actual Type Arguments

Figure 2A:
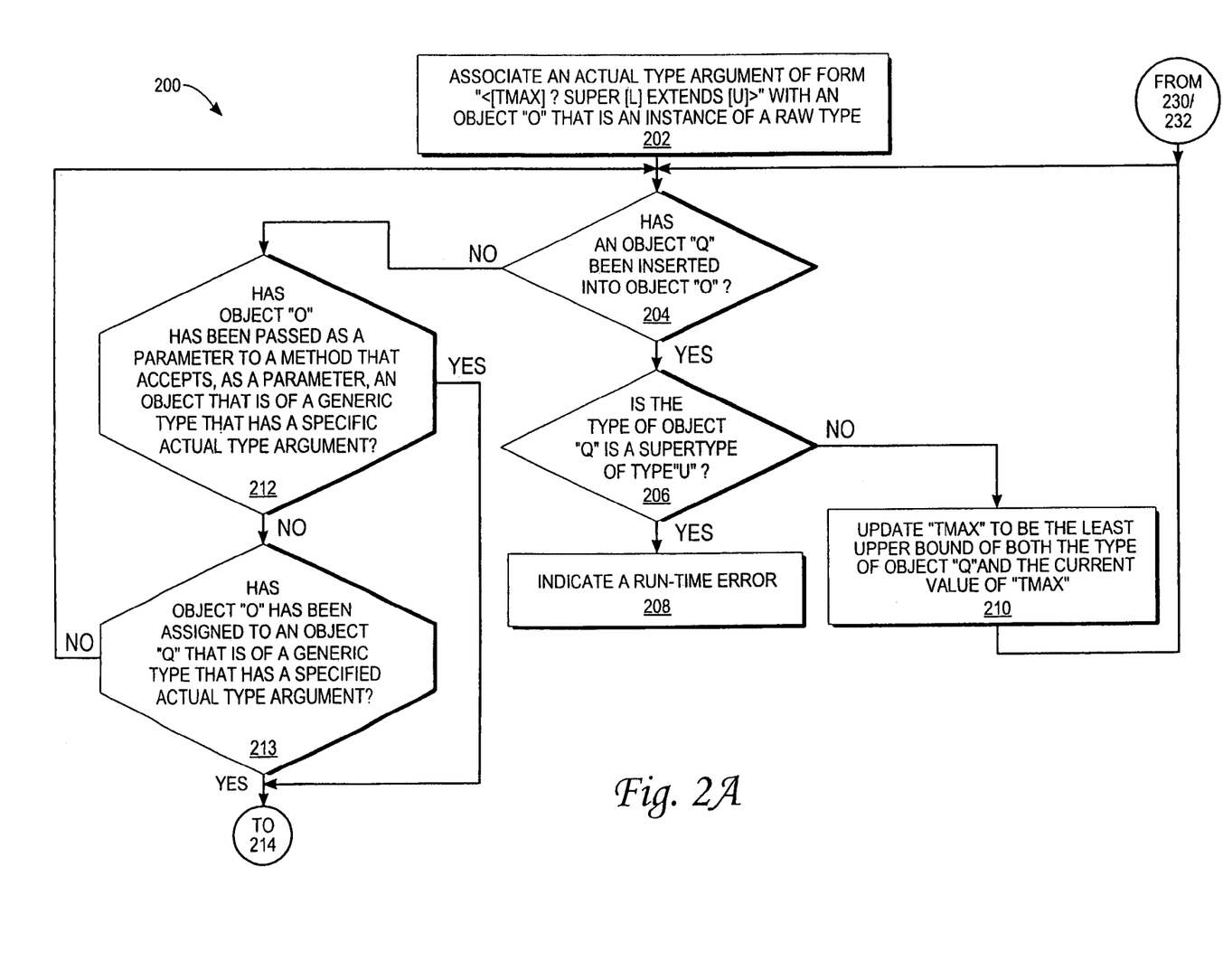
FIG. 2A and FIG. 2B are flow diagrams that illustrate an example technique for determining an actual type argument for a generic type at run time, according to an embodiment of the invention.
Figure 2B:
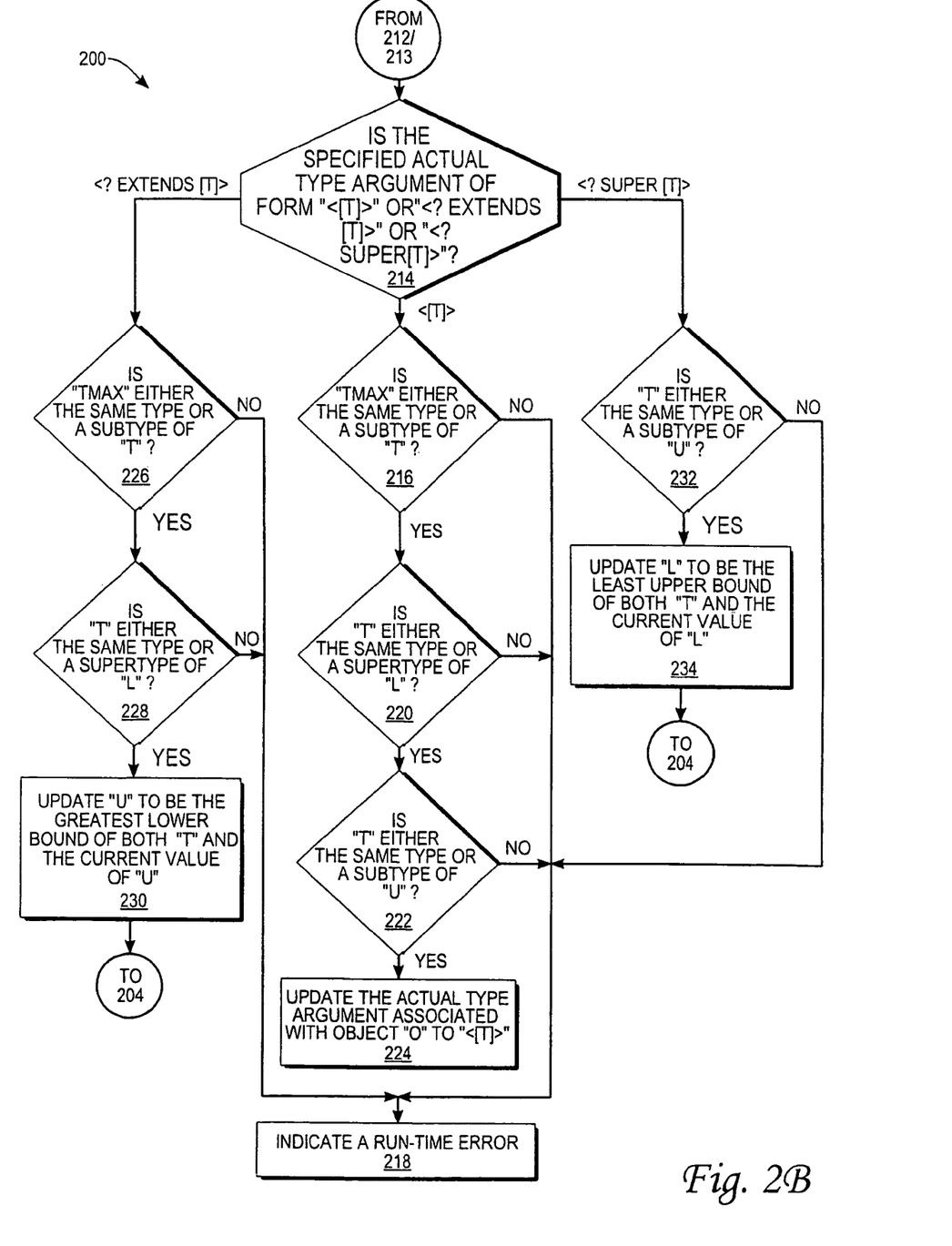

FIG. 2A and FIG. 2B are flow diagrams that illustrate an example technique for determining an actual type argument for a generic type at run time, according to an embodiment of the invention. For example, the JVM may perform such a technique at run time. Although the steps of the technique are shown as being in a particular order for purposes of illustration, the steps of the technique may be performed in orders other than the particular order shown in this example.

Referring to FIG. 2A, in block 202, an actual type argument of the form "<[Tmax] ? super [L] extends [U]>" is associated with an object "O" that is an instance of a raw type. In the actual type argument, the values "Tmax," "L," and "U" function to constrain the bounds of the actual type argument; the actual type argument is of an uncertain type, as signified by the "wildcard" parameter "?" in the actual type argument.

"L" signifies a lower bound type of the actual type argument; this is the most specific type that the uncertain type could be. "U" signifies an upper bound type of the actual type argument; this is the most general type that the uncertain type could be. "Tmax" signifies the most general type of any other object that has been inserted into object "O." As will be discussed below, all of the constraints "Tmax," "L," and "U" may be refined at run time based on the usage of the object. Through this run-time refining process, the actual type argument of the generic type of object "O" is made more certain; the bounds of the actual type argument may "tighten."

Usually, the initial value of "L" is "Null," and the initial value of "U" is "Object." Thus, usually, the uncertain type "?" initially could be any type ranging from the very specific "Null" to the very general "Object." The initial value of "Tmax" is also "Null," because no objects have yet been inserted into object "O."

Each visit to block 204 may correspond to the JVM reading another instruction in the process of executing a program.

In block 204, it is determined whether another object "Q" has been inserted into the object "O." For example, in the course of running a program, the JVM might determine whether a current instruction in the program is an instruction that causes an object to be inserted into object "O." Usually, such insertion is accomplished through a specific insertion method of object "O." For example, the insertion instruction might take the form "O.add(Q)," where "Q" is another object that the "add" method will insert into "O." If another object has been inserted into object "O," then control passes to block 206. Otherwise, control passes to block 212.

In block 206, it is determined whether the type of object "Q" is a supertype of the upper bound type "U." If so, then control passes to block 208. Otherwise, control passes to block 210.

In block 208, a run-time error is indicated. For example, the JVM may halt execution of the program and indicate that an error has occurred. An instance of a supertype of "U" cannot be inserted into an instance of a generic type that has an actual type argument that has "U" as an upper bound. For example, if "Q" is of type "Object," and "O" is of a generic type whose upper bound is "Number," then "Q" cannot be inserted into "O." A collection of numbers cannot contain an object that might not be a number.

Alternatively, in block 210, "Tmax" is updated to be the least upper bound of both the type of object "Q" and the current value of "Tmax." The least upper bound of two types is the most specific supertype of both types. For example, if the type of object "Q" is "Float" and the current value of "Tmax" is "Double," then the least upper bound of the two is "Number." In this case, the value of "Tmax" would be updated to equal "Number." Although "Object" is also a supertype of both "Float" and "Number," for example, "Object" is not as specific as "Number." Control passes back to block 204.

Alternatively, in block 212, it is determined whether object "O" has been passed as a parameter to a method that accepts, as a parameter, an object that is of a generic type that has a specified actual type argument. For example, in the course of running a program, the JVM might determine whether a current instruction in the program is an instruction that causes object "O" to be passed as a parameter to a method that expects the parameter to be an object that is of a generic type that has a specified actual type argument.

For example, the instruction might be in the form "count (O)," where the previous declaration of method "count" was "Integer count(Collection<Number>)." In this example, method "count" expects to receive, as a parameter, an object that is of a generic type (specifically, a "Collection" or subtype thereof) that has the specified actual type argument "<Number>." If object "O" has been passed to such a method, then control passes to block 214 in FIG. 2B. Otherwise, control passes to block 213.

In block 213, it is determined whether object "O" has been assigned to another object "Q" that is of a generic type that has a specified actual type argument. For example, in the course of running a program, the JVM might determine whether a current instruction in the program is an instruction that causes object "O" to be assigned to an object that is of a generic type that has a specified actual type argument.

For example, the instruction might be in the form "Q=O," where the previous declaration of object "Q" was "Collection<Number>Q." In this example, object "Q" is of a generic type (specifically, "Collection") that has the specified actual type argument "<Number>." If object "O" has been assigned to such an object, then control passes to block 214 in FIG. 2B. Otherwise, control passes back to block 204.

In one embodiment, the specified actual type argument discussed in reference to blocks 212 and 213 may take one of three forms. Referring to FIG. 2B, in block 214, it is determined whether the specified actual type argument is of the form "<[T]>," "<? extends [T]>," or "<? super [T]>." In other words, it is determined whether the specified actual type argument is a certain type, an uncertain type with a specified upper bound, or an uncertain type with a specified lower bound. If the specified actual type argument is of the form "<[T]>", then control passes to block 216. If the specified actual type argument is of the form "<? extends [T]>," then control passes to block 226. If the specified actual type argument is of the form "<? super [T]>," then control passes to block 232.

In block 216, it is determined whether the constraining type "Tmax" is either the same type or a subtype of "T." If "Tmax" is either the same type or a subtype of "T," then control passes to block 220. Otherwise, control passes to block 218.

In block 218, a run-time error is indicated. For example, the JVM may halt execution of the program and indicate that an error has occurred.

Alternatively, in block 220, it is determined whether "T" is either the same type or a supertype of the lower bound type "L." If "T" is either the same type or a supertype of "L," then control passes to block 222. Otherwise, control passes back to block 218.

In block 222, it is determined whether "T" is either the same type or a subtype of the upper bound type "U." If "T" is either the same type or a subtype of "U," then control passes to block 224. Otherwise, control passes back to block 218.

In block 224, the actual type argument associated with object "O" is updated from "<[Tmax] ? super [L] extends [U]>" to "<[T]>." At this point, the actual type argument of the generic type of object "O" is certain. For example, if "O" was declared as an instance of raw type "Collection," and if "T" was "<Number>," then the parameterized type of "O," including the actual type argument, becomes "Collection<Number>". There is no need to attempt to further refine the actual type argument.

Alternatively, in the scenario that the specified actual type argument is of form "<? extends [T]>," in block 226, it is determined whether the constraining type "Tmax" is either the same type or a subtype of "T." If "Tmax" is either the same type or a subtype of "T," then control passes to block 228. Otherwise, control passes to block 218.

In block 228, it is determined whether "T" is either the same type or a supertype of the lower bound type "L." If "T" is either the same type or a supertype of "L," then control passes to block 230. Otherwise, control passes back to block 218.

In block 230, "U" is updated to be the greatest lower bound of both "T" and the current value of "U." In other words, "U" is updated to be the least specific subtype of both "T" and "U." Control passes back to block 204 in FIG. 2A.

Alternatively, in the scenario that the specified actual type argument is of form "<? super [T]>," in block 232, it is determined whether "T" is either the same type or a subtype of the upper bound type "U." If "T" is either the same type or a subtype of "U," then control passes to block 234. Otherwise, control passes back to block 218.

In block 234, "L" is updated to be the least upper bound of both "T" and the current value of "L." In other words, "L" is updated to be the most specific supertype of both "T" and "L." Control passes back to block 204 in FIG. 2A.

Thus, the actual type parameter of the generic type of which object "O" is an instance is gradually and dynamically inferred and refined at run time.

Generic Methods

Classes are not the only programmatic entities that may be associated with formal type parameters. Methods also may be associated with formal type parameters. The following code may be considered for purposes of example:

<E>addall(Collection<E>x);

The above code expresses a generic method with a formal type parameter "E." Legacy code might contain an invocation of a pre-generic version of the method, such as:

c.addall(d);

Such an invocation might be called a "raw" invocation because the invocation does not specify the actual type parameter that should take the place of the formal type parameter in the generic method declaration. Using techniques described herein, the actual type parameter may be inferred at run-time based on usage.

For example, some information about the actual type parameter may be inferred from the type of the object that is passed to the method. In the above example, object "d" is passed as a parameter to method "addall( )." If the generic type of object "d" was "Collection<String>" (as could be determined from an earlier invocation such as "Collection<String>d;"), then it could be inferred that the actual type parameter of the raw invocation of method "addall( )" was, at least, broad enough to encompass the "String" type.

In one embodiment, each "raw" invocation of a generic method is associated with a separate actual type parameter. Initially, the actual type parameter associated with a "raw" invocation is "<[X] super [L] extends [U]>." In a manner similar to that described above with reference to generic types, the constraining types "X," "L," and "U" in the actual type parameter may be updated and refined, at run time, based on usage.

Hardware Overview

Figure 3:
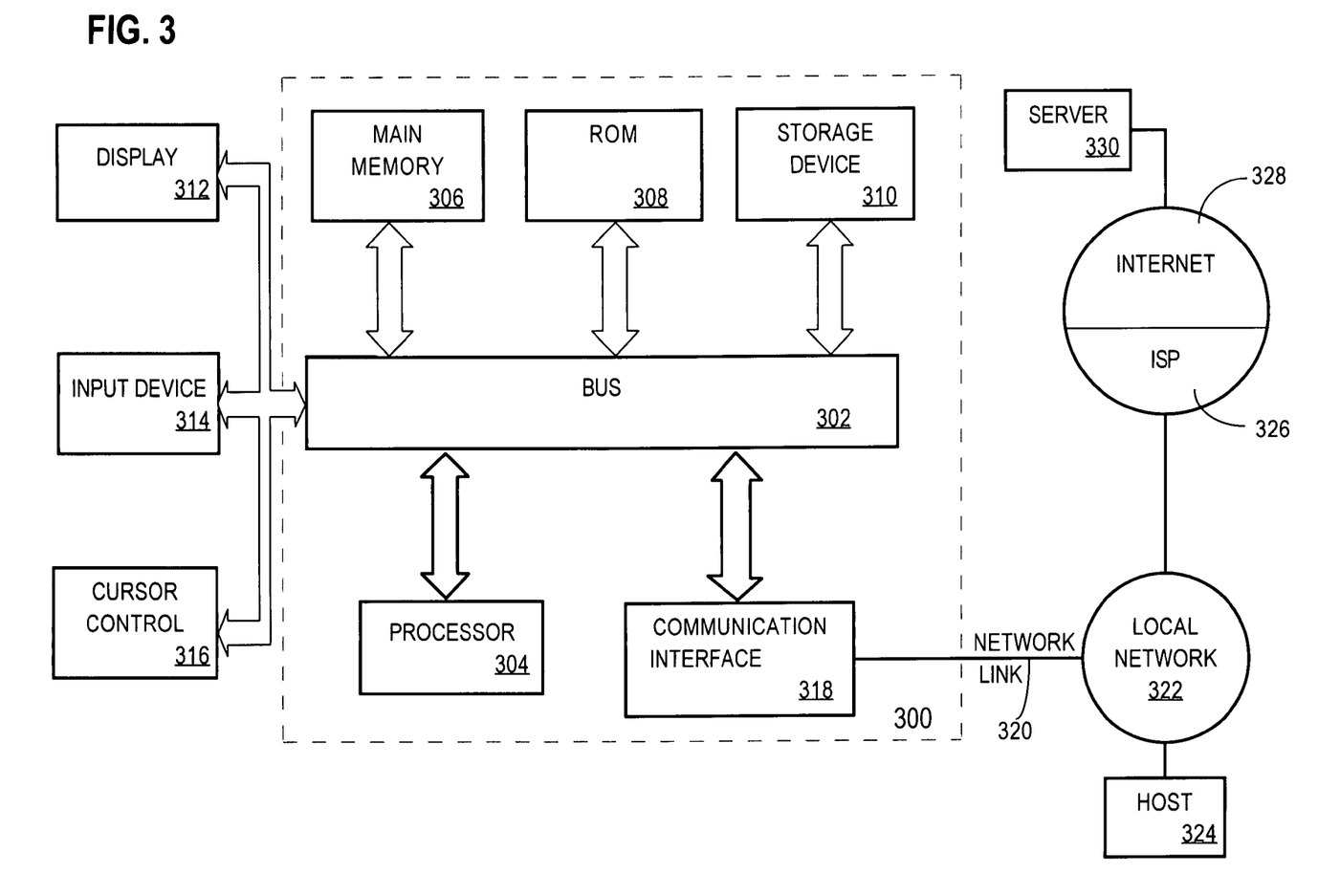
FIG. 3 is a hardware block diagram of an example computer entity, which may be used to embody one or more components of an embodiment of the present invention.

FIG. 3 is a block diagram that illustrates a computer system 300 upon which an embodiment of the invention may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may also be a medium (e.g. air) that enables signals to be capacitively exchanged between one or more of the components. Bus 302 may further be a network connection that connects one or more of the components. Overall, any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. In this instance, the bus 302 would be the medium (such as air) that enables this capacitive communication to take place. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generic type reification, the method comprising:
    determining, based on the usage of a first object at run time, a first actual type argument of a generic type of which the first object is an instance, wherein determining the first actual type argument comprises:
        initially establishing the first actual type argument to be an uncertain type that is constrained by a first upper bound type and a first lower bound type,
        updating the first upper bound type to a second upper bound type based on usage of the first object at runtime, and
        updating the first lower bound type to a second lower bound type based on the usage of the first object at runtime,
        wherein, after updating the first upper bound type and the first lower bound type, the first actual type argument is established as an uncertain type constrained by the second upper bound type and the second lower bound type;
    generating data that indicates the first actual type argument; and
    establishing an association between the first object and the data;
    wherein a declaration of the generic type is of a form that specifies (a) a name of the generic type and (b) following the name, a formal type parameter of the generic type that does not express any actual type argument, but whose presence indicates that the generic type is a type that can contain one or more items that are of types that will be determined by an actual type argument that is to be specified in place of the formal type parameter in a subsequent invocation of the generic type;
    wherein an invocation of the first object does not specify the first actual type argument.

2. The method of claim 1, wherein updating the first lower bound type comprises:
    determining, at run time, that a second object has been inserted into the first object; and
    in response to determining that the second object has been inserted into the first object, performing steps comprising:
        determining a particular type of which the second object is an instance; and
        determining a most specific supertype of both the particular type and the constraining type,
    wherein the second lower bound type is the most specific supertype.

3. The method of claim 1, wherein determining the first actual type argument further comprises:
    determining, at run time, that the first object has been passed to a programmatic method that accepts, as an input parameter, a second object that is of a generic type that is associated with a second actual type argument; and
    in response to determining that the first object has been passed to the programmatic method, updating the first actual type argument to be the second actual type argument.

4. The method of claim 1, wherein determining the first actual type argument further comprises:
    determining, at run time, that the first object has been assigned to a second object that is of a generic type that is associated with a second actual type argument; and
    in response to determining that the first object has been assigned to the second object, updating the first actual type argument to be the second actual type argument.

5. The method of claim 1, wherein updating the first upper bound type comprises:
    determining, at run time, that the first object has been passed to a programmatic method that accepts, as an input parameter, a second object that is of a generic type that is associated with a second actual type argument;
    in response to determining that the first object has been passed to the programmatic method, determining whether the second actual type argument specifies an uncertain type that is constrained by a second upper bound type; and
    in response to determining that the second actual type argument specifies an uncertain type that is constrained by the second upper bound type, determining a least specific subtype of both the first upper bound type and the second upper bound type,
    wherein the second upper bound type is the least specific subtype.

6. The method of claim 1, wherein updating the first upper bound type comprises:
    determining, at run time, that the first object has been assigned to a second object that is of a generic type that is associated with a second actual type argument; and
    in response to determining that the first object has been assigned to the second object, determining whether the second actual type argument specifies an uncertain type that is constrained by a second upper bound type; and
    in response to determining that the second actual type argument specifies an uncertain type that is constrained by the second upper bound type, determining a least specific subtype of both the first upper bound type and the second upper bound type, wherein the second upper bound type is the least specific subtype.

7. The method of claim 1, wherein updating the first lower bound type comprises:

determining, at run time, that the first object has been passed to a programmatic method that accepts, as an input parameter, a second object that is of a generic type that is associated with a second actual type argument;

in response to determining that the first object has been passed to the programmatic method, determining whether the second actual type argument specifies an uncertain type that is constrained by a second lower bound type; and in response to determining that the second actual type argument specifies an uncertain type that is constrained by the second lower bound type, determining a most specific supertype of both the first lower bound type and the second lower bound type, wherein the second lower bound type is the most specific supertype.

8. The method of claim 1, wherein updating the first lower bound type comprises:

determining, at run time, that the first object has been assigned to a second object that is of a generic type that is associated with a second actual type argument; and in response to determining that the first object has been assigned to the second object, determining whether the second actual type argument specifies an uncertain type that is constrained by a second lower bound type; and in response to determining that the second actual type argument specifies an uncertain type that is constrained by the second lower bound type, determining a most specific supertype of both the first lower bound type and the second lower bound type, wherein the second lower bound type is the most specific supertype.

9. A volatile or non-volatile computer-readable storage medium storing one or more sequences of instructions, which instructions, when executed by one or more processors, cause the one or more processors to carry out the steps of:

determining, based on the usage of a first object at run time, a first actual type argument of a generic type of which the first object is an instance, wherein determining the first actual type argument comprises:

initially establishing the first actual type argument to be an uncertain type that is constrained by a first upper bound type and a first lower bound type, updating the first upper bound type to a second upper bound type based on usage of the first object at runtime, and updating the first lower bound type to a second lower bound type based on the usage of the first object at runtime, wherein, after updating the first upper bound type and the first lower bound type, the first actual type argument is established as an uncertain type constrained by the second upper bound type and the second lower bound type;

generating data that indicates the first actual type argument; and establishing an association between the first object and the data;

wherein a declaration of the generic type is of a form that specifies (a) a name of the generic type and (b) following the name, a formal type parameter of the generic type that does not express any actual type argument, but whose presence indicates that the generic type is a type that can contain one or more items that are of types that will be determined by an actual type argument that is to be specified in place of the formal type parameter in a subsequent invocation of the generic type;

wherein an invocation of the first object does not specify the first actual type argument.

10. The volatile or non-volatile computer-readable storage medium of claim 9, wherein updating the first lower bound type comprises:

determining, at run time, that a second object has been inserted into the first object; and in response to determining that the second object has been inserted into the first object, performing steps comprising:

determining a particular type of which the second object is an instance; and determining a most specific supertype of both the particular type and the constraining type, wherein the second lower bound type is the most specific supertype.

11. The volatile or non-volatile computer-readable storage medium of claim 9, wherein determining the first actual type argument further comprises:

determining, at run time, that the first object has been passed to a programmatic method that accepts, as an input parameter, a second object that is of a generic type that is associated with a second actual type argument; and in response to determining that the first object has been passed to the programmatic method, updating the first actual type argument to be the second actual type argument.

12. The volatile or non-volatile computer-readable storage medium of claim 9, wherein determining the first actual type argument further comprises:

determining, at run time, that the first object has been assigned to a second object that is of a generic type that is associated with a second actual type argument; and in response to determining that the first object has been assigned to the second object, updating the first actual type argument to be the second actual type argument.

13. The volatile or non-volatile computer-readable storage medium of claim 9, wherein updating the first upper bound type comprises:

determining, at run time, that the first object has been passed to a programmatic method that accepts, as an input parameter, a second object that is of a generic type that is associated with a second actual type argument;

in response to determining that the first object has been passed to the programmatic method, determining whether the second actual type argument specifies an uncertain type that is constrained by a second upper bound type; and in response to determining that the second actual type argument specifies an uncertain type that is constrained by the second upper bound type, determining a least specific subtype of both the first upper bound type and the second upper bound type, wherein the second upper bound type is the least specific subtype.

14. The volatile or non-volatile computer-readable storage medium of claim 9, wherein updating the first upper bound type comprises:

determining, at run time, that the first object has been assigned to a second object that is of a generic type that is associated with a second actual type argument; and in response to determining that the first object has been assigned to the second object, determining whether the second actual type argument specifies an uncertain type that is constrained by a second upper bound type; and in response to determining that the second actual type argument specifies an uncertain type that is constrained by the second upper bound type, determining a least specific subtype of both the first upper bound type and the second upper bound type, wherein the second upper bound type is the least specific subtype.

15. The volatile or non-volatile computer-readable storage medium of claim 9, wherein updating the first lower bound type comprises:

determining, at run time, that the first object has been passed to a programmatic method that accepts, as an input parameter, a second object that is of a generic type that is associated with a second actual type argument;

in response to determining that the first object has been passed to the programmatic method, determining whether the second actual type argument specifies an uncertain type that is constrained by a second lower bound type; and in response to determining that the second actual type argument specifies an uncertain type that is constrained by the second lower bound type, determining a most specific supertype of both the first lower bound type and the second lower bound type, wherein the second lower bound type is the most specific supertype.

16. The volatile or non-volatile computer-readable storage medium of claim 9, wherein updating the first lower bound type comprises:

determining, at run time, that the first object has been assigned to a second object that is of a generic type that is associated with a second actual type argument; and in response to determining that the first object has been assigned to the second object, determining whether the second actual type argument specifies an uncertain type that is constrained by a second lower bound type; and in response to determining that the second actual type argument specifies an uncertain type that is constrained by the second lower bound type, determining a most specific supertype of both the first lower bound type and the second lower bound type, wherein the second lower bound type is the most specific supertype.

* * * * *